Dec. 29, 1931.  C. BOWERS  1,838,654
ELECTRIC LIGHT CONTROL
Original Filed March 29, 1929  5 Sheets-Sheet 1

INVENTOR
Charley Bowers
BY
Howard Freeman
his ATTORNEY

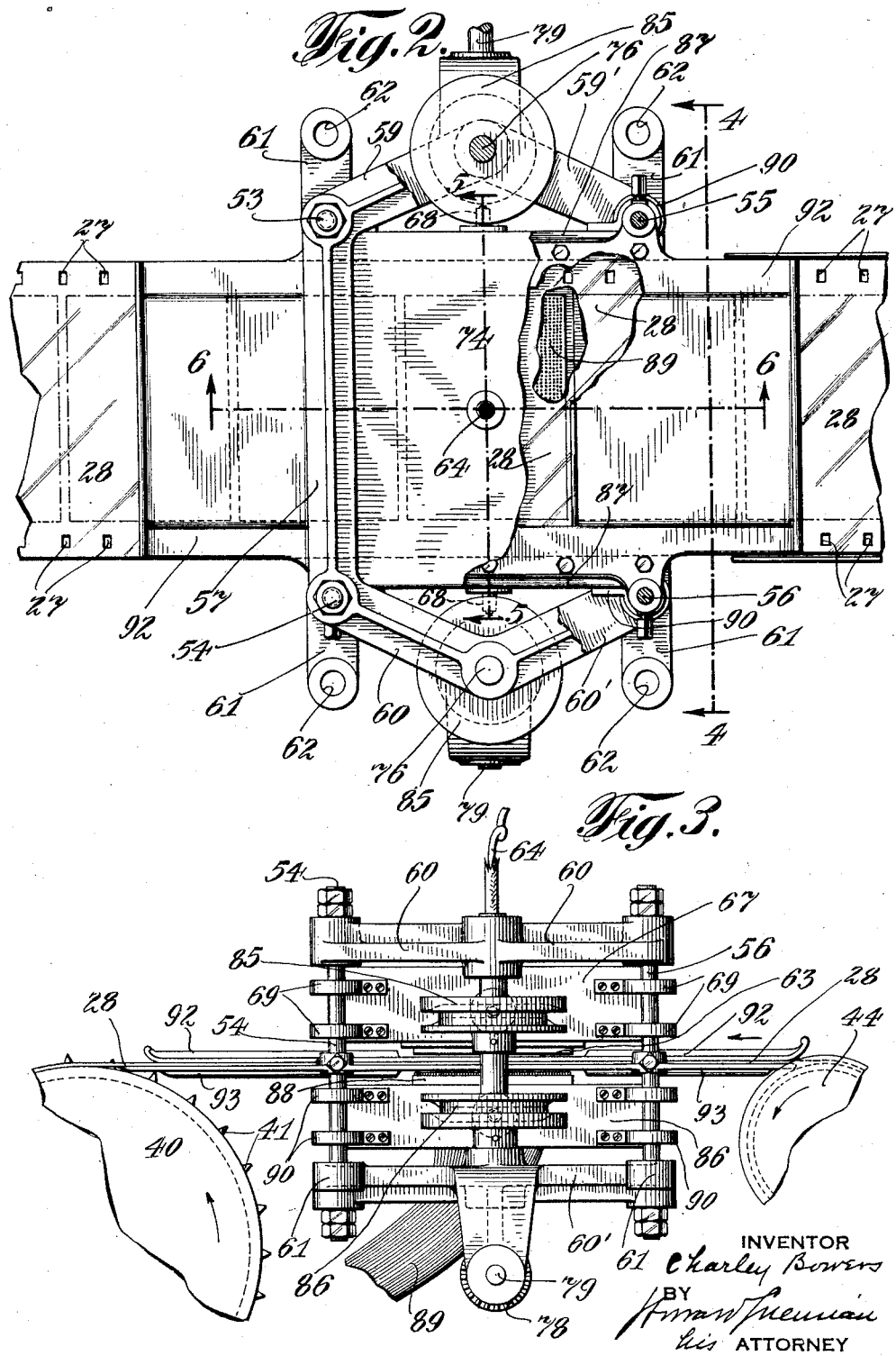

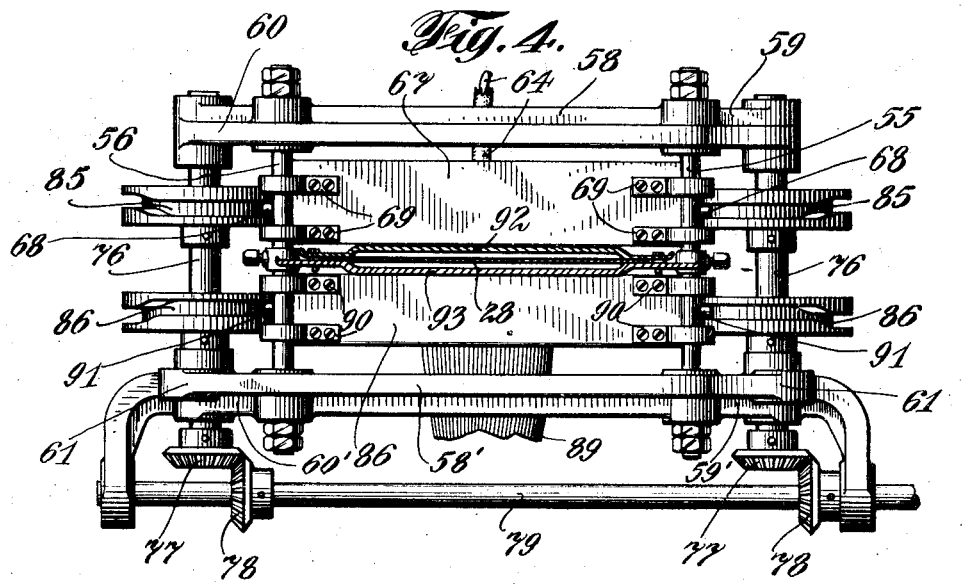
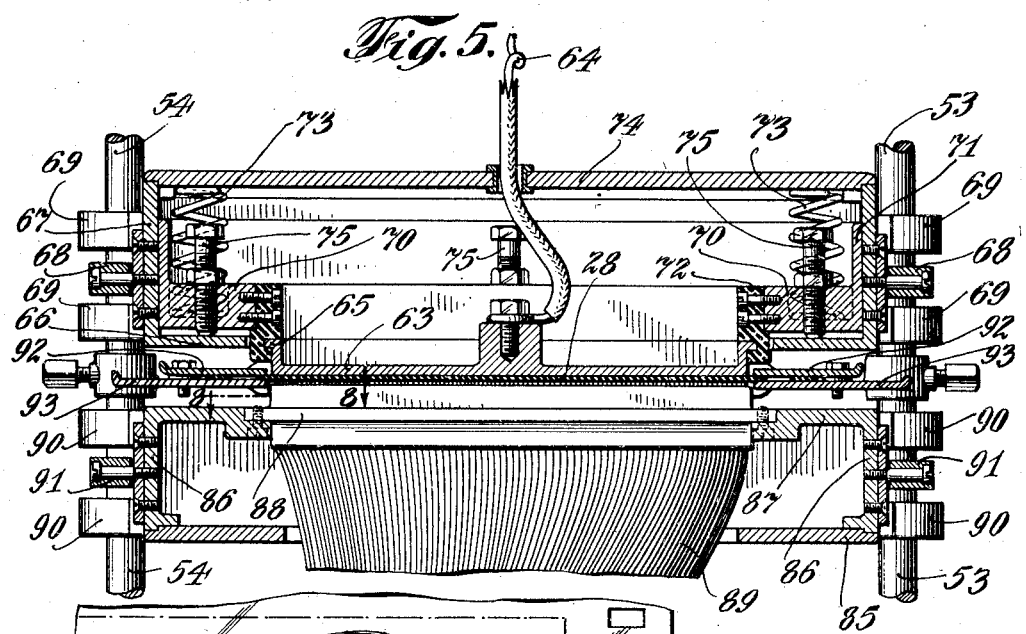
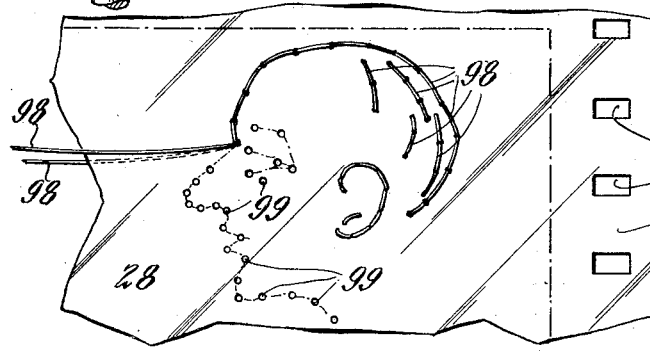

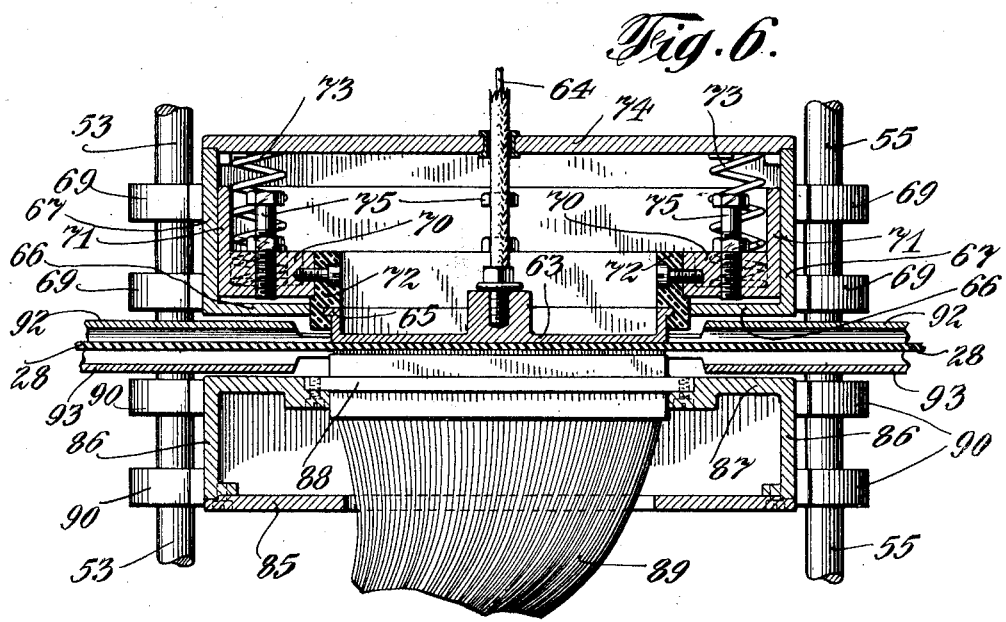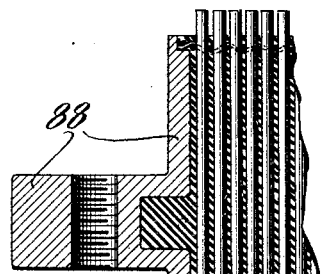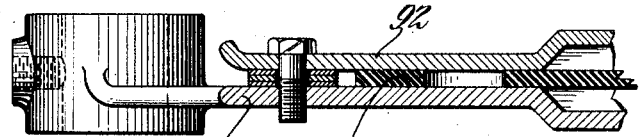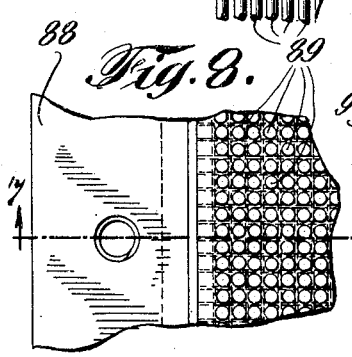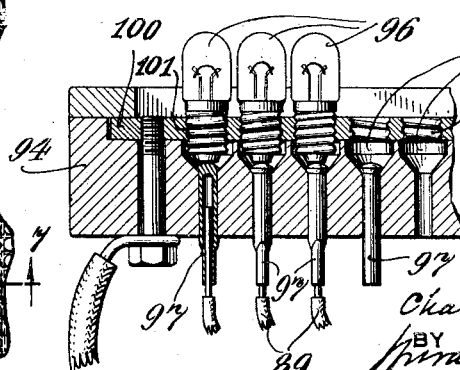

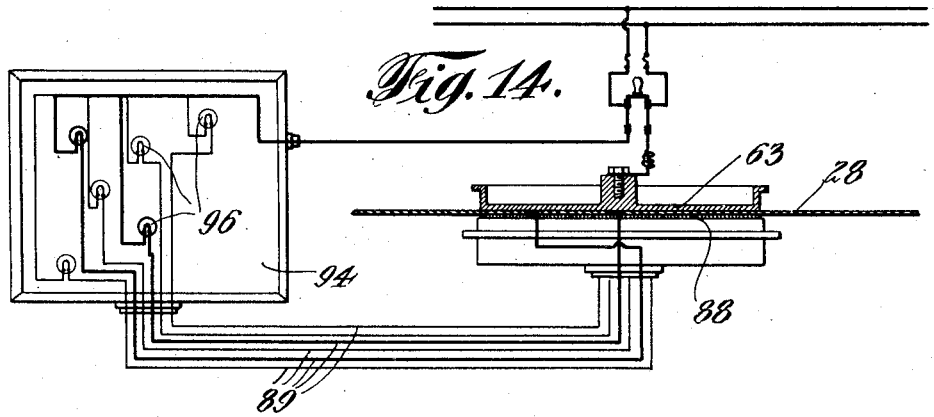
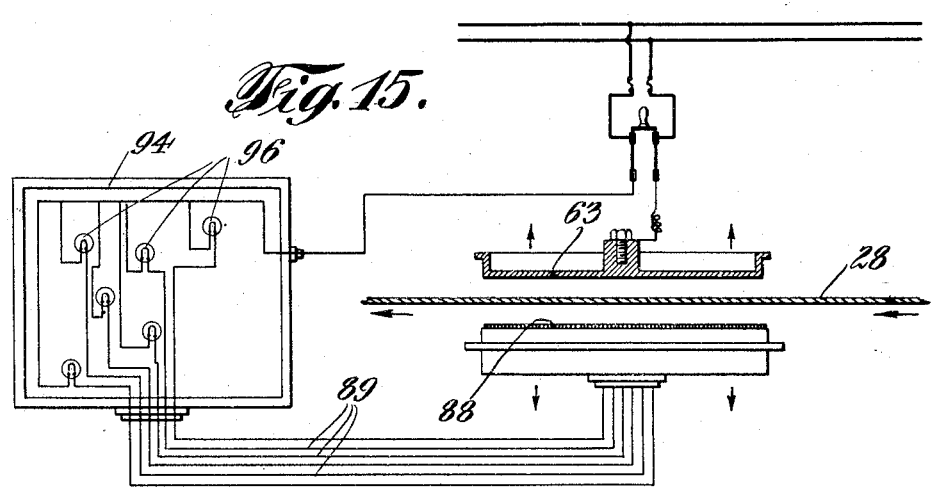
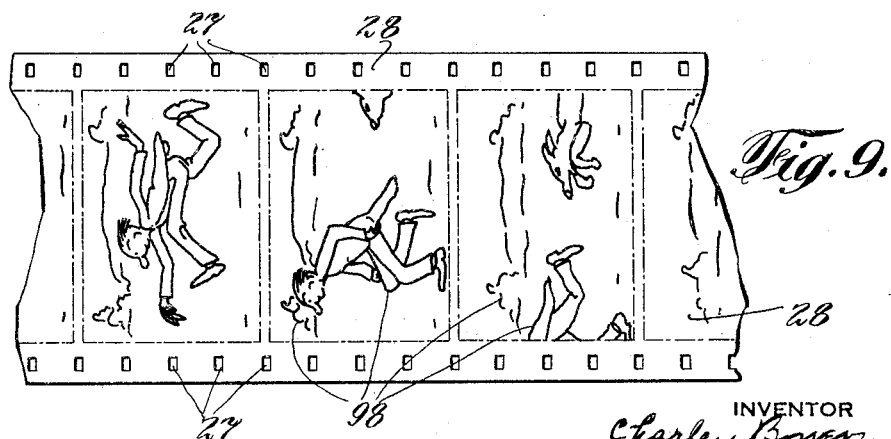

Patented Dec. 29, 1931

1,838,654

UNITED STATES PATENT OFFICE

CHARLEY BOWERS, OF NEW YORK, N. Y.

ELECTRIC LIGHT CONTROL

Application filed March 29, 1929, Serial No. 350,921. Renewed May 22, 1931.

My invention relates to electric light controls and refers particularly to electric signs capable of producing the effect of moving objects.

One of the objects of my invention is an electric sign having a plurality of electric light bulbs, a predetermined number and arrangement of which may be illuminated by an intermittently moving flexible tape.

Another object of my invention is an electric sign having a plurality of electric light bulbs, the illumination of a predetermined number and arrangement of which will produce the effect of moving objects.

Other objects of my invention will be evident upon a consideration of my specification and its accompanying drawings.

Among the objections to the present employed devices for attempting to present the effect of moving objects by means of a plurality of electric lights are the excessive cost of construction, the impossibility of giving a fairly accurate appearance of moving objects and the impossibility of changing the moving picture from one subject to another without practically dismantling the device and reconstructing it.

The above, and other, objections to the present used devices for the purposes indicated have caused electric signs of this character to receive but comparatively limited adoption.

The above mentioned objections also apply to electric signs where the presentation is directed to a plurality of still effects, such as advertisements and announcements.

It is evident, therefore, that all electric signs which can be readily changed from one still subject to another, from one moving effect to another and from a still subject to a moving effect without any change in the electric sign construction or in the moving mechanism will be of the greatest value, and the device of invention possesses these properties.

The construction of my electric sign and the mechanism for operating it is much less expensive than those at present employed, and, further, it can be used interchangeably, as desired, for still subjects, moving effects, or both, without any change whatever in such construction.

It is evident therefore, that my invention possesses a means whereby the cost of such illuminated presentations may be divided between a number of advertisers at an extremely low cost to each of them, thus presenting advantages not possessed by the present known devices.

In a broad way my invention comprises a device through which the intermitent passage of a flexible film will cause the illumination of a predetermined number and arrangement of electric light bulbs, thus presenting a desired illuminated effect.

In order to change the effect, therefore, it is necessary only to change the flexible film, the mechanism of my device remaining unaltered.

The novelty and advantages of my device are evident from my specification and its accompanying drawings, in which similar parts are designated by similar numerals.

Figure 2 is a fragmentary top view of Figure 1.

Figure 3 is a fragmentary enlarged front view of Figure 1, in open position.

Figure 4 is a section through the line 4—4 of Figure 2.

Figure 5 is a section through the line 5—5 of Figure 2.

Figure 6 is a section through the line 6—6 of Figure 2.

Figure 7 is a section through the line 7—7 of Figure 8.

Figure 8 is a top view along the line 8—8 of Figure 5.

Figure 9 is a fragmentary view of my flexible film.

Figure 10 is a fragmentary vertical cross-section of the film guide.

Figure 11 is a vertical cross-section of a portion of the electric sign.

Figure 12 is an enlarged fragmentary view of my film.

Figure 13 is an enlarged vertical cross-section of my film showing one method of producing the contact members.

Figure 14 is a diagrammatic view of the electric circuits when the device is in contact position.

Figure 15 is a diagrammatic view of the electric circuits when the device is in non-operative position.

Figure 1:
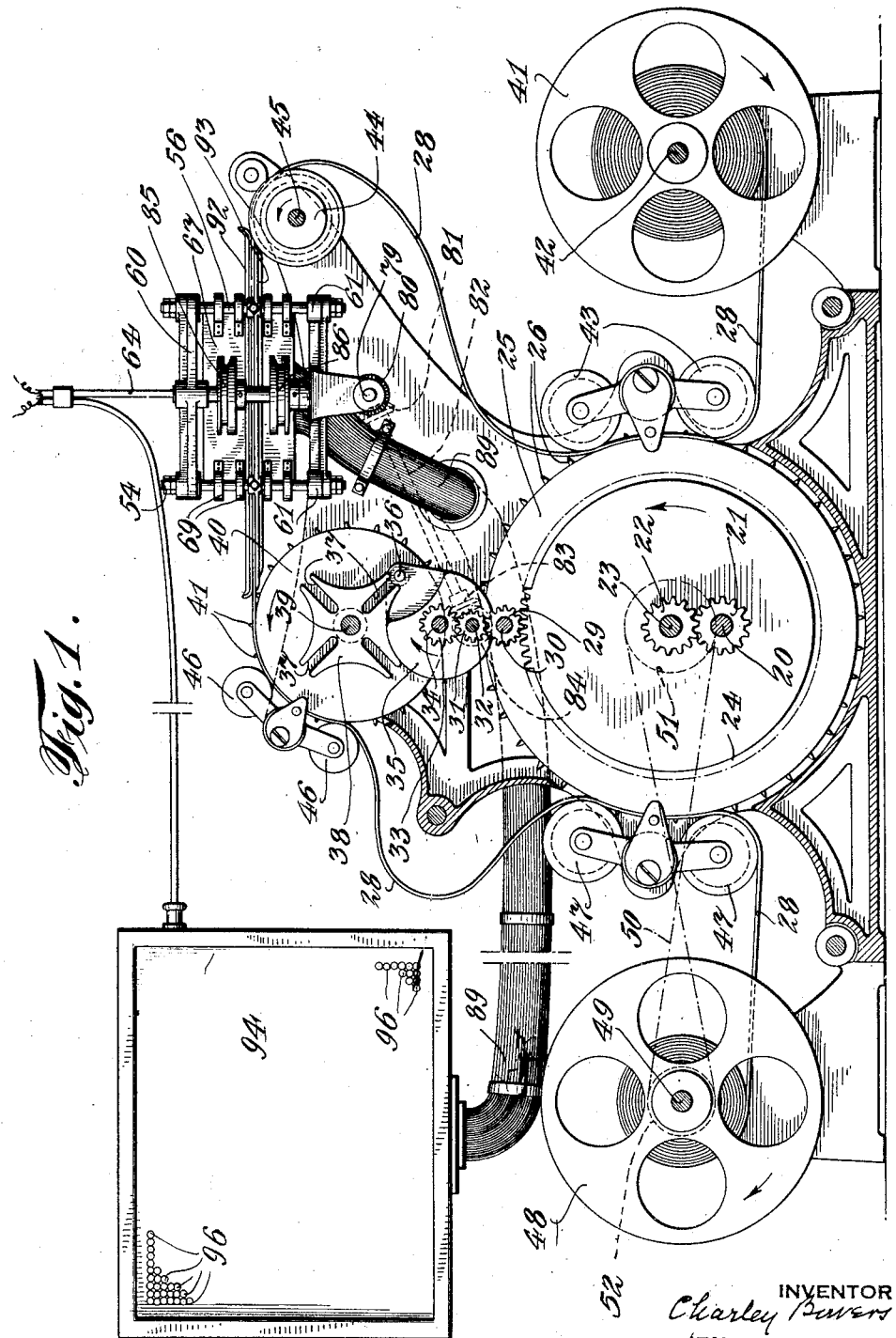
Figure 1 is a front view of one form of the device of my invention and its accompanying parts.

The particular form of my device shown in the accompanying drawings comprises the drive shaft 20 carrying the fixedly attached gear 21 meshing with the gear 22 fixedly attached to the revoluble shaft 23. The shaft 23 carries also the gear 24 and the drum 25, the latter having two oppositely positioned series of teeth 26, 26 capable of insertion into the opposite perforations 27, 27 of the flexible film 28.

The gear 24 meshes with the gear 29 carried by the revoluble shaft 30, which in turn meshes with the gear 31 carried by the revoluble shaft 32, and the gear 31 meshes with the gear 33 carried by the revoluble shaft 34.

The shaft 34 carries the member 35 having an extended pin 36, insertable within the recesses 37, 37 of the member 38 fixedly attached to the revoluble shaft 39. The shaft 39 carries also the drum 40, the latter having two oppositely positioned series of teeth 41, 41 capable of insertion into the opposite perforations 27, 27 of the flexible film 28.

The constant revolution of the drive shaft 20 thus gives an intermittent revolution to the drum 40 through the medium of the Geneva movement above described.

The reel holder 41 revoluble upon the shaft 42 carries the flexible film 28, which passes between the face of the drum 25 and the two idlers 43, 43, which maintains some of the teeth 26, 26 within the perforations 27, 27; thence over the idler 44 carried by the shaft 45; thence through the electrical circuit connecting mechanism described later; thence between the face of the drum 40 and the idlers 46, 46, which maintain some of the teeth 41, 41 within the perforations 27, 27; thence between the face of the drum 25 and the two idlers 47, 47 which maintain some of the teeth 26, 26 within the perforations 27, 27, thence around the film-reel 48 revoluble upon the shaft 49. The belt 50 is carried by the pulley 51 of the shaft 23 and the pulley 52 of the shaft 49.

The revolution of the drive shaft 20, therefore causes the film 28 to have an intermittent movement through the electrical circuit connecting mechanism.

The circuit make-and-break device comprises four upright supporting rods 53, 54, 55, 56 retained in position by an upper member comprising the two side pieces 57 and 58 and the two angular end pieces, 59 and 60, and a lower member of similar construction indicated by prime numerals, the elements 57' and 58' of the lower member, however, being extended into the arms 61, 61 each having an opening 62 therein, these arms acting as means for attachment of the device to a support.

An upper contact device comprises the electric conductible base plate 63, to which is attached the electric wire 64 attached to a source of electric current not shown. The side of the base plate 63 is extended upwardly and then outwardly forming the supporting flange rim 65, a vertically movable member comprises the bottom 66 having an opening therein through which the base plate 63 is passable, and a side member 67. Four eye members 69, 69, attached to the side 67 act as guides for the vertically movable member.

Within the said vertically movable member is a base-supporting member having the bottom 70 and the side 71. Fixedly attached to the bottom 70 is an electrical nonconductor member 72, having a recess therein for the insertion of the flange support, 65. Four coil springs 73, 73, abut upon the cover 74, the other ends of the springs being positioned within recesses in the bottom, 70, the springs thus tending to downwardly press the bottom 70 and its attached contact base 63. Four set-screws 75, 75 are threaded through openings in the member 70 and abut upon the bottom member 66, the positions of the set-screws 75, 75 thus determining the spaced relationship between the member 70 and 66 and consequently the position of the contact base 63 with respect to the member 70.

Two revoluble shafts 76, 76 are supported by the members 59, 60, 59', 60', the lower ends of the shafts carrying the bevel gears 77, 77 meshable with the bevel gears 78, 78 carried by the revoluble shaft 79, the latter carrying the bevel gear 80 meshable with the bevel gear 81 of the revoluble shaft 82, which also carries a bevel gear 83 meshable with the bevel gear 84 of the shaft 32. The revolution of the drive shaft 20 will thus revolve the shafts 76, 76. Fixedly attached to each shaft 76 are two annular cams 85 and 86.

A lower contact device comprises a carrier having the bottom 85, the sides 86, 86 and the top 87. Supported by the top 87 and extending therethrough is a lower contact base 88 having a plurality of holes through which a number of electric wires 89, 89 insulated from each other are passed, the upper ends of the wires being extended slightly above the face of the contact base 88. The sides 86, 86 carry four eye-members 90, 90 which act as guides for the vertical movement of the lower contact device, which carries, also, two oppositely positioned rollers 91, 91.

Between the upper contact base, or plate, 63 and the lower contact base, or plate, 88, is a pair of guide plates 93, 93 between which the film 28 is passable, the guide plates having openings therein to allow the two contact plates to abut, if desired, or to abut upon the film 28.

It will be noted that the rollers 68, 68 of the upper contact device are positioned within the cam-ways of the cams 85, 85 and that the rollers 91, 91 of the lower contact device are positioned within the cam-ways of the cams 86, 86 and that, hence, the revolutions of the shafts 76, 76 will cause the upper and lower contact devices to reciprocally approach to, and separate from, each other.

It will thus be seen that the revolution of the drive shaft 20 will pass the film 28 intermittently between the contact plates 63 and 88, the contact plates being separated during the movement periods of the film 28 and abutting upon said film during the non-movement periods.

It is evident that one of the contact plates may be stationary and the other movable, but I prefer the form of device in which both plates move.

The electric sign comprises a wooden base 94 carrying a metallic plate 100, connected with a source of electric current. A plurality of threaded holes, 101, 101 within the plate 100 are in alignment with holes 95, 95 extending through the base 94. Within each hole 95 is a tubular contact member 97, within which a wire 89 is inserted and the tube compressed to maintain the wire. An electric light bulb 96 is inserted in each hole 101.

The particular forms of a film 28 illustrated in the accompanying drawings comprises a strip of flexible material, preferably a cardboard of such composition and construction as to be suitable for reeling. This strip carries a plurality of electric current conducting elements passing therethrough, and, without limiting myself to the particular means described, I show one method of producing this result as follows: I pass two copper wires 98 in opposite directions through a plurality of holes 99, 99 outlining the design which I am desirous of reproducing in electric lights. It will thus be seen that when the two contact plates 63 and 88 are brought into contact with the film 28, a circuit will be formed by the wires 89, 89 in contact with the wires 98, 98, and as these wires are connected with correspondingly positioned bulbs in the sign, the lights in the sign will be a reproduction of the design upon the film 28.

Other methods may be employed for accomplishing the same result, as by the use of copper, or other conductive, studs, or otherwise.

Figures 14 and 15 diagrammatically show the electric circuits and the direction of movement of the film, Figure 14 illustrating the device in lighting position with two bulbs illuminated and the film stationary, and Figure 15 illustrating the device in non-illuminating position and the film moving.

It is to be noted from the foregoing that a complete change of electric illuminations can be made by simply employing a different film without any change of mechanism, that my device can be employed for still pictures and motion pictures, that short timed subjects may be economically produced, that the device is automatic in action, that the film 28 can be readily and cheaply produced and can be reused as desired and that my device has the universality of usefulness for the production of a variety of effect as has the motion picture projector.

I do not limit myself to the particular size, shape, number, arrangement or material of parts as shown and described as these are given simply as a means for describing the device of my invention.

What I claim is:

1. In a device of the character described, in combination, an upper non-foraminous vertically movable base plate of electric conductible material, means for imparting a reciprocating movement to said base plate, a lower perforated non-conductible contact plate, a conductor wire extending through each opening in said contact plate and extending above the upper face thereof, a strip of flexible non-conductive material carrying a plurality of electric conductors therethrough, means for intermittently moving said strip between said base plate and said contact plate, and means for moving said base plate into contact with said strip during the stationary period of said strip completing a circuit between said base plate and said contact plate.

2. In a device of the character described, in combination, an upper non-perforated vertically movable base plate of electric conductible material, cam means for imparting a reciprocating movement to said base plate, a lower perforated non-conductible contact plate, a conductor wire extending through each opening in said contact plate and extending above the upper face thereof, a strip of flexible non-conductive material carrying a plurality of electric conductors therethrough, means for intermittently moving said strip between said base plate and said contact plate, and means for moving said base plate into contact with said strip during the stationary period of said strip completing a circuit between said base plate and said contact plate.

3. In a device of the character described, in combination, an upper non-perforated vertically movable base plate of electric conductible material, cam means for imparting a reciprocal movement to said base plate, means for limiting the reciprocating movement of said base plate, a lower perforated non-conductible contact plate, a conductor wire extending through each opening in said contact plate and extending above the upper face thereof, a strip of flexible non-conducting material carrying a plurality of electric conductors therethrough, means for intermittently moving said strip and said contact plate, and means for moving said base plate into contact with said strip during the stationary period of said strip completing the circuit between said base plate and said contact plate.

4. In a device of the character described, in combination, a non-perforated base plate of electric conductible material, a perforated non-conducting contact plate spaced from said base plate, a conductor wire extending through each opening in said contact plate and extending beyond the face thereof in the direction of said base plate, means for causing reciprocating movement of said base plate and said contact plate with respect to each other, a strip of flexible non-conductible material carrying a plurality of electric conductors therethrough, means for intermittently moving said strip between said base plate and said contact plate, and means causing said base plate and said contact plate to abut upon opposite sides of said strip during the stationary period of said strip.

5. In a device of the character described, in combination, a non-perforated base plate of electric conductible material, a perforated non-conducting contact plate spaced from said base plate, a conductor wire extending through each opening in said contact plate and extending beyond the face thereof in the direction of said base plate, cam means for causing reciprocating movement of said base plate and said contact plate with respect to each other, a strip of flexible non-conductible material carrying a plurality of electric conductors therethrough, means for intermittently moving said strip between said base plate and said contact plate, and means causing said base plate and said contact plate to abut upon opposite sides of said strip during the stationary period of said strip.

6. In a device of the character described, in combination, a non-perforated base plate of electric conductible material, a perforated non-conducting contact plate spaced from said base plate, a conductor wire extending through each opening in said contact plate and extending beyond the face thereof in the direction of said base plate, means for causing reciprocating movement of said base plate and said contact plate with respect to each other, means for limiting said reciprocal movement, a strip of flexible non-conductible material carrying a plurality of electrical conductors therethrough, means for intermittently moving said strip between said base plate and said contact plate, and means causing said base plate and said contact plate to abut upon opposite sides of said strip during the stationary period of said strip.

Signed at New York city, in the county of New York and State of New York, this 28th day of March, 1929.

CHARLEY BOWERS.